US012304202B2

(12) United States Patent
Ueda

(10) Patent No.: US 12,304,202 B2
(45) Date of Patent: May 20, 2025

(54) INKJET RECORDING APPARATUS

(71) Applicant: KYOCERA Document Solutions Inc., Osaka (JP)

(72) Inventor: Hiroyuki Ueda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 190 days.

(21) Appl. No.: 18/190,743

(22) Filed: Mar. 27, 2023

(65) Prior Publication Data

US 2023/0311497 A1 Oct. 5, 2023

(30) Foreign Application Priority Data

Mar. 31, 2022 (JP) ................................ 2022-058428

(51) Int. Cl.

*B41J 2/125* (2006.01)
*B41J 11/00* (2006.01)
*B41J 11/42* (2006.01)
*B41J 29/38* (2006.01)

(52) U.S. Cl.

CPC ........... *B41J 2/125* (2013.01); *B41J 11/0035* (2013.01); *B41J 11/007* (2013.01); *B41J 11/42* (2013.01); *B41J 29/38* (2013.01)

(58) Field of Classification Search

CPC ...... B41J 2/125; B41J 11/0035; B41J 11/007; B41J 11/42; B41J 29/38
See application file for complete search history.

(56) References Cited

U.S. PATENT DOCUMENTS 5,589,858 A 12/1996 Kadowaki et al. ............. 347/14
8,411,308 B2 * 4/2013 Hara ...................... B41J 11/007 358/1.15

FOREIGN PATENT DOCUMENTS

JP 4-226379 A 8/1992
JP 11-106090 A 4/1999

* cited by examiner

*Primary Examiner* — Geoffrey S Mruk
(74) *Attorney, Agent, or Firm* — Stein IP LLC

(57) ABSTRACT

An inkjet recording apparatus includes a conveyance belt, a recording head, a control portion, an interval detection sensor, a thickness detection reference member, and a storage portion. The control portion is capable of executing an interval detection mode, a thickness calculation mode, and a landing timing correction mode. In the landing timing correction mode, the control portion sets the landing timing to be equal to a reference landing timing when the thickness of the conveyance belt stored in the storage portion is equal to a predetermined reference thickness, sets the landing timing to be earlier than the reference landing timing when the thickness of the conveyance belt stored in the storage portion is larger than the reference thickness, and sets the landing timing to be later than the reference landing timing when the thickness of the conveyance belt stored in the storage portion is smaller than the reference thickness.

11 Claims, 14 Drawing Sheets

INKJET RECORDING APPARATUS

INCORPORATION BY REFERENCE

This application is based on and claims the benefit of priority from Japanese Patent Application No. 2022-058428 filed on Mar. 31, 2022, the contents of which are hereby incorporated by reference.

BACKGROUND

The present disclosure relates to an inkjet recording apparatus.

Inkjet recording apparatuses are capable of forming a high-definition image and thus have conventionally been widely used as recording apparatuses such as facsimile machines, copiers, and printers. Inkjet recording apparatuses form an image by ejecting ink onto a recording medium such as a paper sheet, an OHP sheet, an envelope, etc.

Typical inkjet recording apparatuses each include a conveyance belt, a recording head and a control portion. The conveyance belt is an endless belt wound around and supported by a plurality of rollers. The conveyance belt conveys a recording medium placed on a surface thereof. The recording head includes a plurality of nozzles. The nozzles are disposed so as to be opposed to the conveyance belt. The recording head ejects ink through the nozzles to thereby form an image on the recording medium that is being conveyed. The control portion controls landing timing with which the ink ejected from the recording head lands on the recording medium.

Among such inkjet recording apparatuses, there is one that includes a belt speed detection mechanism. The belt speed detection mechanism is constituted of a pulse plate and a detection sensor. The pulse plate is disposed on a roller that supports the conveyance belt, and rotates along with the roller. The detection sensor detects the pulse plate passing a predetermined position. From the detected cycle of the pulse plate, the control portion detects the rotation speed of the roller, that is, the moving speed of the conveyance belt (a belt running speed).

This control portion corrects ink ejection timing based on a detection result of the detection sensor mentioned above. Even if the running speed of the belt has slightly changed, the control portion adjusts the ink ejection timing in coordination with timing with which a sheet reaches a position opposite at which the sheet is opposed to the nozzles. This helps prevent image failure such as misalignment from being caused in an image formed on a recording medium due to the changed running speed of the belt.

Now, if, in such an inkjet recording apparatus, large unevenness occurs in the thickness of the conveyance belt, it will invite a deviation between the running speed of the belt and the linear speed of the belt (a moving speed of the surface of the belt). With the belt speed detection mechanism described above, it is impossible to detect the deviation of the linear speed of the belt. Thus, even if the control portion has corrected the ink ejection timing based on the running speed of the belt, there may still occur a deviation in the landing timing of ink onto a sheet. Then, misalignment may occur in the image formed on the sheet to cause image failure.

In particular, in a case where the unevenness in the thickness of the conveyance belt results from long-periodic and comparatively large variation with respect to the running direction of the conveyance belt, there is a risk of a remarkable image misalignment.

To address such a problem, there have been proposed inkjet recording apparatuses capable of appropriately correcting image misalignment with various methods. One example of such inkjet recording apparatuses employs a configuration where the moving speed of a recording medium itself or the linear speed of a conveyance belt itself is detected by means of a doppler speed sensor, which is a non-contact sensor. With this configuration, even with unevenness in the thickness of the conveyance belt, variation in the moving speed of the recording medium and variation in the linear speed of the conveyance speed are detected, the landing timing of ink is corrected, and image failure is suppressed.

Another example of such inkjet recording apparatuses employs a configuration where a change in the thickness of the conveyance belt is detected by measuring a change in the height of a recording medium, while it is being conveyed, by means of a rolling member that is in contact with an end part of the recording medium. Corresponding to the detected change in the thickness of the conveyance belt, the landing timing of ink is corrected, and image failure is suppressed.

SUMMARY

According to one aspect of the present disclosure, an inkjet recording apparatus includes a conveyance belt, a recording head, and a control portion. The conveyance belt is an endless belt and conveys a recording medium. The recording head is opposed to the conveyance belt, and includes a plurality of nozzles that perform image formation by ejecting ink onto the recording medium conveyed by the conveyance belt. The control portion controls landing timing of ink ejected from the recording head onto the recording medium. The inkjet recording apparatus further includes an interval detection sensor, a thickness detection reference member, and a storage portion. The interval detection sensor is disposed opposite the conveyance belt across a predetermined interval, and detects a thickness of the conveyance belt. The thickness detection reference member is opposed to the interval detection sensor with the conveyance belt therebetween, and contacts a surface of the conveyance belt on a side opposite to the interval detection sensor. The storage portion stores the thickness of the conveyance belt detected by the interval detection sensor. The conveyance belt has formed therein a detection hole that penetrates therethrough at a position overlapping with the thickness detection reference member with respect to a belt width direction perpendicular to a recording-medium conveyance direction. The interval detection sensor is capable of detecting a first opposition interval, which is between the interval detection sensor and the conveyance belt, and a second opposition interval, which is between the interval detection sensor and the thickness detection reference member, via the detection hole. The control portion is capable of executing: an interval detection mode in which the conveyance belt is caused to rotate and in which the first opposition interval and the second opposition interval are detected; a thickness calculation mode in which the thickness of the conveyance belt is calculated from a difference value between the first opposition interval and the second opposition interval detected in the interval detection mode and in which the thickness of the conveyance belt is stored in the storage portion; and a landing timing correction mode in which the landing timing is controlled corresponding to the thickness of the conveyance belt stored in the storage portion. In the landing timing correction mode, the control portion sets the landing timing to be equal to reference landing timing when the thickness of the conveyance belt stored in the storage portion is equal to a predetermined reference thickness, sets the landing timing to be earlier than the reference landing timing when the thickness of the conveyance belt stored in the storage portion is larger than the reference thickness, and sets the landing timing to be later than the reference landing timing when the thickness of the conveyance belt stored in the storage portion is smaller than the reference thickness.

DETAILED DESCRIPTION

Figure 1:
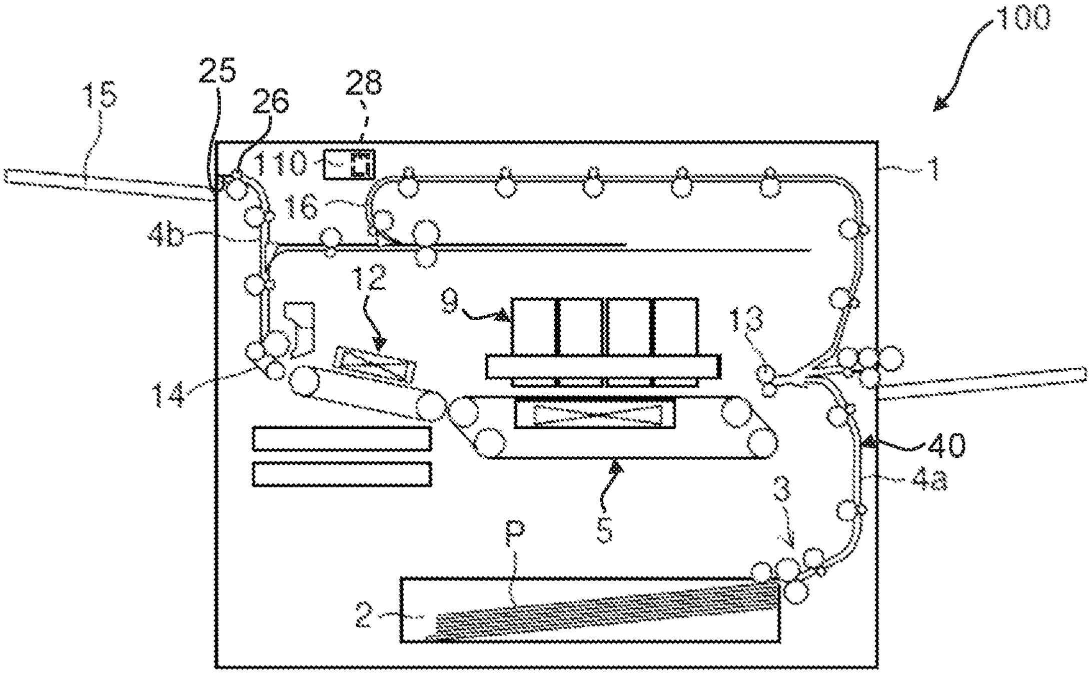
FIG. 1 is a diagram showing a schematic configuration of a printer according to a first embodiment of the present disclosure.
Figure 2:
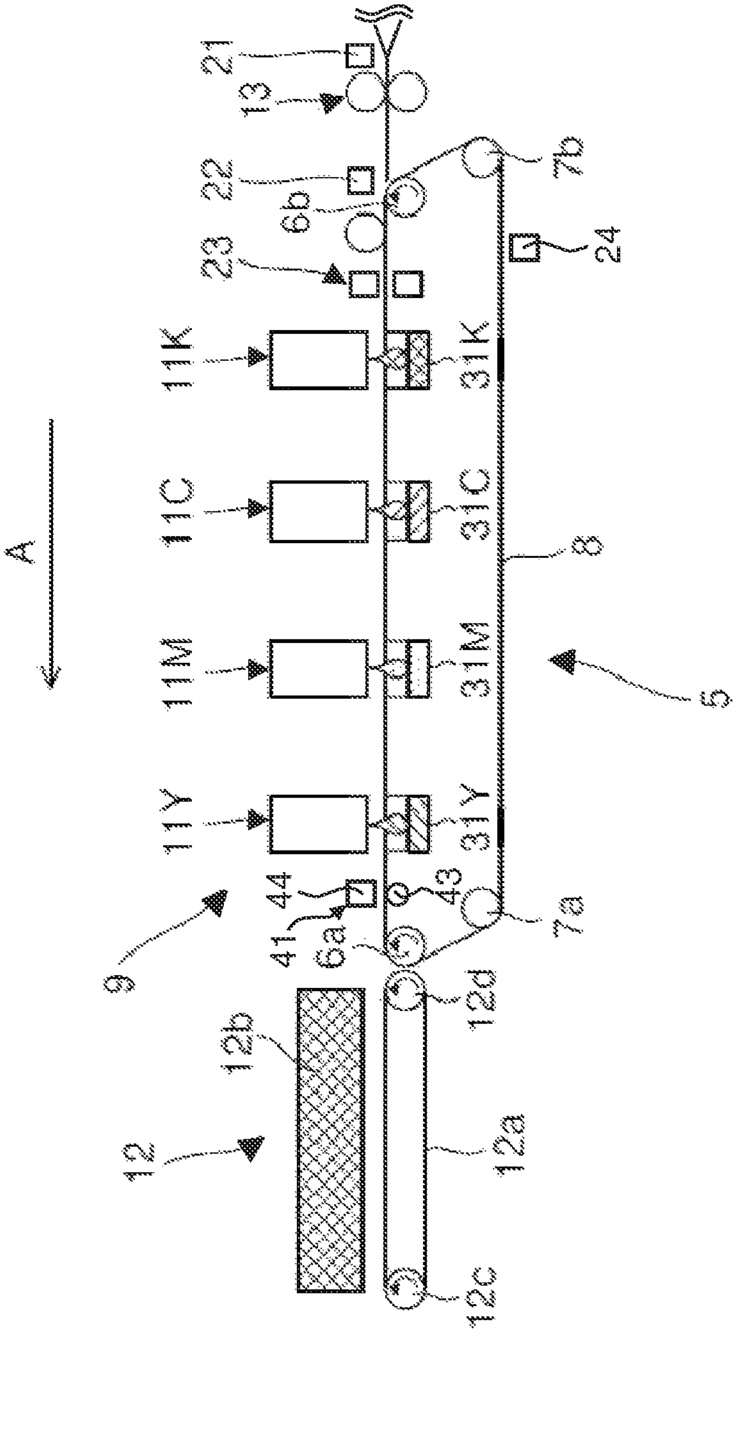
FIG. 2 is a schematic diagram showing a first conveyance unit and the vicinity thereof.

Hereinafter, embodiments of the present disclosure will be described with reference to the accompanying drawings. FIG. 1 is a diagram showing a schematic configuration of a printer 100 (an inkjet recording apparatus) according to a first embodiment of the present disclosure. FIG. 2 is a schematic diagram showing a first conveyance unit 5 and the vicinity thereof. An arrow-A direction indicated in FIG. 2 is a direction in which a paper sheet P is conveyed (hereinafter referred to as the sheet conveyance direction). A direction perpendicular to the sheet conveyance direction (that is, a direction indicated by an arrow BB') is a direction of the width of a paper sheet P (hereinafter referred to as the sheet width direction).

As shown in FIGS. 1 and 2, the printer 100 includes a sheet conveyance device 40, a recording portion 9, a thickness detection mechanism 41, a storage portion 28, and a control device 110 (a control portion).

The sheet conveyance device 40 includes a sheet feeding cassette 2, a sheet feeding device 3, a first sheet conveyance path 4*a*, a pair of registration rollers 13, the first conveyance unit 5, a second conveyance unit 12, a decurler 14, a reverse conveyance path 16, and a sheet discharge tray 15. The sheet conveyance device 40 conveys a paper sheet P from the sheet feeding cassette 2 to the sheet discharge tray 15.

The sheet feeding cassette 2 is disposed in a lower part inside a printer main body 1. Inside the sheet feeding cassette 2, a recording medium (a printing paper sheet, an OHP sheet, an envelope, or the like) is stored. Herein, descriptions are given by taking a paper sheet P as an example of the recording medium.

The sheet feeding device 3 is disposed downstream of the sheet feeding cassette 2 with respect to the sheet conveyance direction. The first sheet conveyance path 4*a* is connected to the sheet feeding cassette 2 via the sheet feeding device 3. The first sheet conveyance path 4*a* is formed so as to extend upward inside the printer main body 1. The first conveyance unit 5 is connected to a downstream-side end part of the first sheet conveyance path 4*a* with respect to the sheet conveyance direction via the pair of registration rollers 13 therebetween. The second conveyance unit 12 is disposed next to the first conveyance unit 5 on a downstream side of the first conveyance unit 5 with respect to the sheet conveyance direction.

The sheet feeding device 3 feeds paper sheets P from the sheet feeding cassette 2 into the first sheet conveyance path 4*a* while separating the paper sheets P one by one. The first sheet conveyance path 4*a* conveys a paper sheet P sent out by the sheet feeding device 3 toward the pair of registration rollers 13. While correcting skewed feeding of the paper sheet P, the pair of registration rollers 13 send out the paper sheet P toward the first conveyance unit 5 (a first conveyance belt 8, which will be described later) with predetermined timing. The first conveyance unit 5 conveys the paper sheet P downstream in the sheet conveyance direction to deliver it to the second conveyance unit 12. Details of the first conveyance unit 5 will be described later.

The second conveyance unit 12 includes a second conveyance belt 12*a* and a dryer 12*b*. The second conveyance belt 12*a* is an endless belt, and is stretched by a driving roller 12*c* and a driven roller 12*d*. The dryer 12*b* is opposed to the second conveyance belt 12*a*. The dryer 12*b* dries ink ejected onto the paper sheets P.

Downstream of the second conveyance unit 12 with respect to the sheet conveyance direction, a second sheet conveyance path 4*b* is connected to the second conveyance unit 12 with the decurler 14 therebetween. The decurler 14 corrects curl generated in the paper sheets P. The second sheet conveyance path 4*b* extends from the decurler 14 toward a discharge port 25 that is open in a side face of the printer main body 1. At the discharge port 25, a pair of discharge rollers 26 are provided. On the side face of the printer main body 1, below the discharge port 25, the sheet discharge tray 15 is provided. The pair of discharge rollers 26 discharge the paper sheet P through the discharge port 25 onto the sheet discharge tray 15.

The reverse conveyance path 16 is provided in an upper part of the printer main body 1 so as to be above the recording portion 9. An upstream-side end part of the reverse conveyance path 16 with respect to the sheet conveyance direction is connected to the second sheet conveyance path 4*b*. A downstream-side end part of the reverse conveyance path 16 with respect to the sheet conveyance direction is connected to a downstream-side end part of the first sheet conveyance path 4*a*. That is, the downstream-side end part of the reverse conveyance path 16 is connected to the first conveyance unit 5 via the pair of registration rollers 13. When double-sided printing is to be executed, the reverse conveyance path 16 switches the conveyance direction of a paper sheet P passing through the second sheet conveyance path 4*b* to convey the paper sheet P back to the first conveyance unit 5 while turning it upside down.

As shown in FIGS. 1 and 2, the first conveyance unit 5 includes a first conveyance belt 8, a driving roller 6*a*, a speed detection roller 6*b*, and tension rollers 7*a* and 7*b*.

The first conveyance belt 8 is an endless belt. The first conveyance belt 8 is preferably a seamless belt having no seam. Along a running direction of the first conveyance belt 8 (the arrow-A direction indicated in FIG. 2), the speed detection roller 6*b*, the driving roller 6*a*, the tension roller 7*a*, and the tension roller 7*b* are disposed in this order.

The driving roller 6*a* is supported in the printer main body 1 so as to be rotatable by an unillustrated driving mechanism (such as a motor). The driving roller 6*a* and the speed detection roller 6*b* are arranged with a predetermined interval therebetween in a horizontal direction. The tension rollers 7*a* and 7*b* are disposed below the driving roller 6*a* and the speed detection roller 6*b*. The speed detection roller 6*b* and the tension rollers 7*a* and 7*b* are rotatably supported in the printer main body 1.

The first conveyance belt 8 is wound around the driving roller 6*a*, the speed detection roller 6*b*, and the tension rollers 7*a* and 7*b*. The tension rollers 7*a* and 7*b* press an inner circumferential surface of the first conveyance belt 8 such that a predetermined tension is generated in the first conveyance belt 8.

Rotation of the driving roller 6*a* causes the first conveyance belt 8 to rotate along the sheet conveyance direction (the arrow-A direction). Specifically, the driving roller 6*a* is caused to rotate by the driving mechanism (of which illustration is omitted), the rotation is transferred to the first conveyance belt 8 by friction force. As a result, the first conveyance belt 8 rotates along with the driving roller 6*a*. When the first conveyance belt 8 rotates, the speed detection roller 6*b* and the tension rollers 7*a* and 7*b* are caused to rotate following the first conveyance belt 8.

To the speed detection roller 6*b*, a speed detection mechanism (of which illustration is omitted) is connected. This speed detection mechanism is capable of detecting the rotation speed of the speed detection roller 6*b*, that is, a rotation speed (a running speed) of the first conveyance belt 8.

Figure 3:
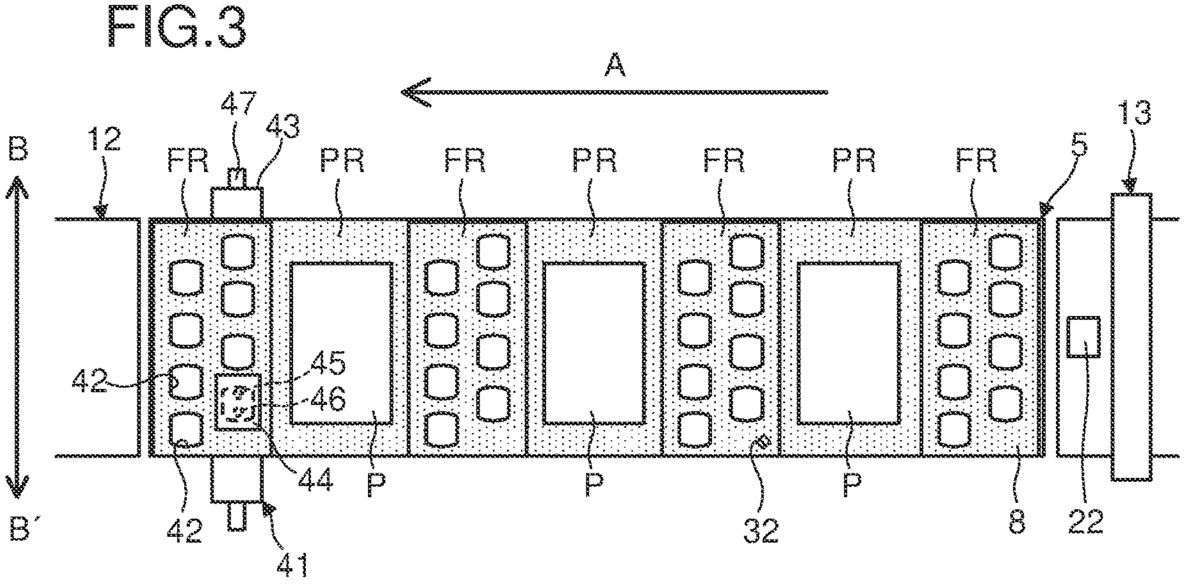
FIG. 3 is a plan view of a surface of a first conveyance belt as seen from above.

FIG. 3 is a plan view of a surface of the first conveyance belt 8 as seen from above. As shown in FIG. 3, in the surface of the first conveyance belt 8 of the present embodiment, a plurality of sheet loading regions PR and a plurality of flushing regions FP are formed. The sheet loading regions PR and the flushing regions FR are alternately arranged in the running direction of the first conveyance belt 8 (the sheet conveyance direction). The sheet loading regions PR are regions for loading the paper sheets P sent from the pair of registration rollers 13. The paper sheets P on the sheet loading regions PR are conveyed downstream by running of the first conveyance belt 8.

In each of the flushing regions FR, a plurality of detection holes 42 are formed. In one of the flushing regions FR, a reference position detection hole 32 is formed. The detection holes 42 and the reference position detection hole 32 are through holes that penetrate through the first conveyance belt 8. The detection holes 42 in each of the flushing regions FR are arranged in a plurality of (here, two) rows along the sheet width direction. The detection holes 42 in each row are arranged linearly in parallel with the sheet width direction, at regular intervals. The reference position detection hole 32 is different in shape from the detection holes 42.

Figure 7:
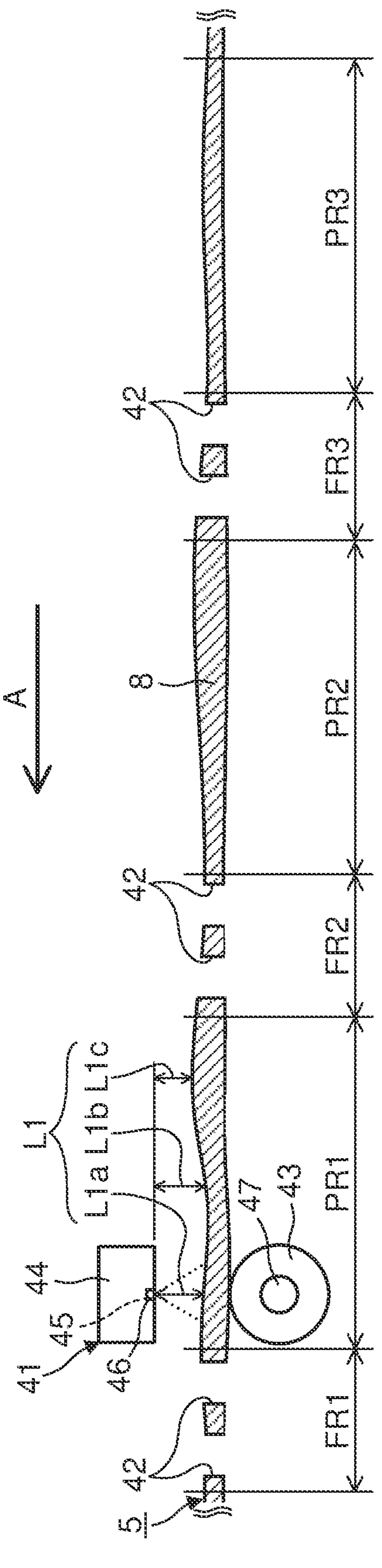
FIG. 7 is a sectional view of the first conveyance belt taken along a sheet conveyance direction.

Here, the thickness of the first conveyance belt 8 may vary at different positions therein in the sheet conveyance direction (see FIG. 7). Let a designed value (an appropriate value without variation) of the thickness of the first conveyance belt 8 be a reference thickness, and let the linear speed of the first conveyance belt 8 (the moving speed of the surface of the first conveyance belt 8) observed when the thickness of the first conveyance belt 8 is equal to the reference thickness the first conveyance belt 8 be a reference linear speed.

In a case where the thickness of the first conveyance belt 8 is larger than the reference thickness at a predetermined part, when this predetermined part comes into contact with the driving roller 6*a*, a rotation radius of the surface of the first conveyance belt 8 increases. As a result, the linear speed of the first conveyance belt 8 becomes higher than the reference linear speed. In contrast, in a case where the thickness at the predetermined part is smaller than the reference thickness, the rotation radius of the surface of the first conveyance belt 8 decreases, and the linear speed of the first conveyance belt 8 becomes lower than the reference linear speed.

Thus, even when the driving roller 6*a* rotates at a constant speed along the sheet conveyance direction, if unevenness occurs in the thickness of the first conveyance belt 8, the linear speed of the first conveyance belt 8, that is, a paper-sheet-P conveyance speed, becomes nonconstant.

the sheet conveyance device 40 further includes, in addition to the above configuration, a registration sensor 20, a first sheet sensor 22, a second sheet sensor 23, and a belt sensor 24 (a reference hole detection sensor).

The registration sensor 20 is disposed upstream of the pair of registration rollers 13 with respect to the sheet conveyance direction. The registration sensor 20 detects a paper sheet P sent to the pair of registration rollers 13. The control device 110, which will be described later, controls timing of starting rotation of the pair of registration rollers 13 based on a detection result of the registration sensor 20. Thereby, it is possible to correct skew (skewed conveyance) of a paper sheet P and adjust timing of feeding the skew-corrected paper sheet P to the first conveyance belt 8.

The first sheet sensor 22 is disposed at a position that is, with respect to the sheet conveyance direction, between the pair of registration rollers 13 and an upstream-side end part (a part overlapping with the speed detection roller 6*b*) of the first conveyance belt 8. The first sheet sensor 22 detects a width-direction position of a paper sheet P sent from the pair of registration rollers 13 to the first conveyance belt 8.

The second sheet sensor 23 is disposed at a position that is, with respect to the sheet conveyance direction, downstream of the first sheet sensor 22 but is upstream of a line head 11K, which is the most-upstream one of line heads 11Y to 11K. The second sheet sensor 23 detects passing of a paper sheet P fed to the first conveyance belt 8 by the pair of registration rollers 13.

The belt sensor 24 is an optical photosensor capable of detecting the reference position detection hole 32. The belt sensor 24 is disposed at a position that is upstream of the tension roller 7*b* but is downstream of the tension roller 7*a* with respect to the running direction of the first conveyance belt 8. The belt sensor 24 is opposed to the first conveyance belt 8. The belt sensor 24 is located at a position that overlaps with the reference position detection hole 32 with respect to the belt width direction. When the first conveyance belt 8 runs and the reference position detection hole 32 reaches the position opposed to the belt sensor 24 (the position that overlaps with the belt sensor 24 with respect to the running direction of the first conveyance belt 8), the belt sensor 24 detects the reference position detection hole 32.

Next, conveyance of paper sheets P will be described. As shown in FIGS. 1 and 2, a paper sheet P is conveyed from the sheet feeding cassette 2, through the first sheet conveyance path 4*a*, to the pair of registration rollers 13, and then is loaded by the pair of registration rollers 13 on the first conveyance belt 8 with predetermined timing. The first conveyance unit 5 causes the first conveyance belt 8 to run to convey the paper sheet P loaded thereon downstream in the sheet conveyance direction. Meanwhile, from the recording portion 9, which will be described later, ink of different colors is sequentially ejected onto a surface of the paper sheet P with predetermined timing, and thereby an image is formed.

When the paper sheet P reaches the position that overlaps with the driving roller 6*a*, the paper sheet P is transferred to the second conveyance unit 12 to be loaded on the second conveyance belt 12*a*. The second conveyance unit 12 conveys the paper sheet P loaded on the second conveyance belt 12*a* downstream in the sheet conveyance direction. Meanwhile, the ink on the paper sheet P is dried by the dryer 12*b*.

When the paper sheet P reaches a position that overlaps with the driving roller 12*c* with respect to a running direction of the second conveyance belt 12*a*, the paper sheet P is transferred to the second sheet conveyance path 4*b*. Meanwhile, curl of the paper sheet P is corrected by the decurler 14.

Here, in a case where no double-sided printing is to be performed with respect to the paper sheet P, the second sheet conveyance path 4*b* conveys the paper sheet P toward the pair of discharge rollers 26. The pair of discharge rollers 26 discharge the paper sheet P onto the sheet discharge tray 15 through the discharge port 25.

In a case where double-sided printing is to be performed with respect to the paper sheet P, the second sheet conveyance path 4*b* conveys the paper sheet P to the reverse conveyance path 16. The reverse conveyance path 16 conveys the paper sheet P to the pair of registration rollers 13 again while turning the paper sheet P upside down. Then, the pair of registration rollers 13 convey the paper sheet P to the first conveyance unit 5. Thereby, an image is formed on the other side of the paper sheet P. The paper sheet P having undergone the double-sided printing is conveyed by the second sheet conveyance path 4*b* to the pair of discharge rollers 26, and is discharged onto the sheet discharge tray 15.

Next, a description will be given of a configuration of the recording portion 9 and image formation on a paper sheet P. As shown in FIGS. 1 and 2, the recording portion 9 is located at a position that overlaps with the first conveyance unit 5 with respect to the sheet conveyance direction. The recording portion 9 is opposed to the first conveyance belt 8. The recording portion 9 ejects ink toward a paper sheet P that is being conveyed by the first conveyance belt 8, and thereby forms an image on a surface of the paper sheet P.

Figure 4:
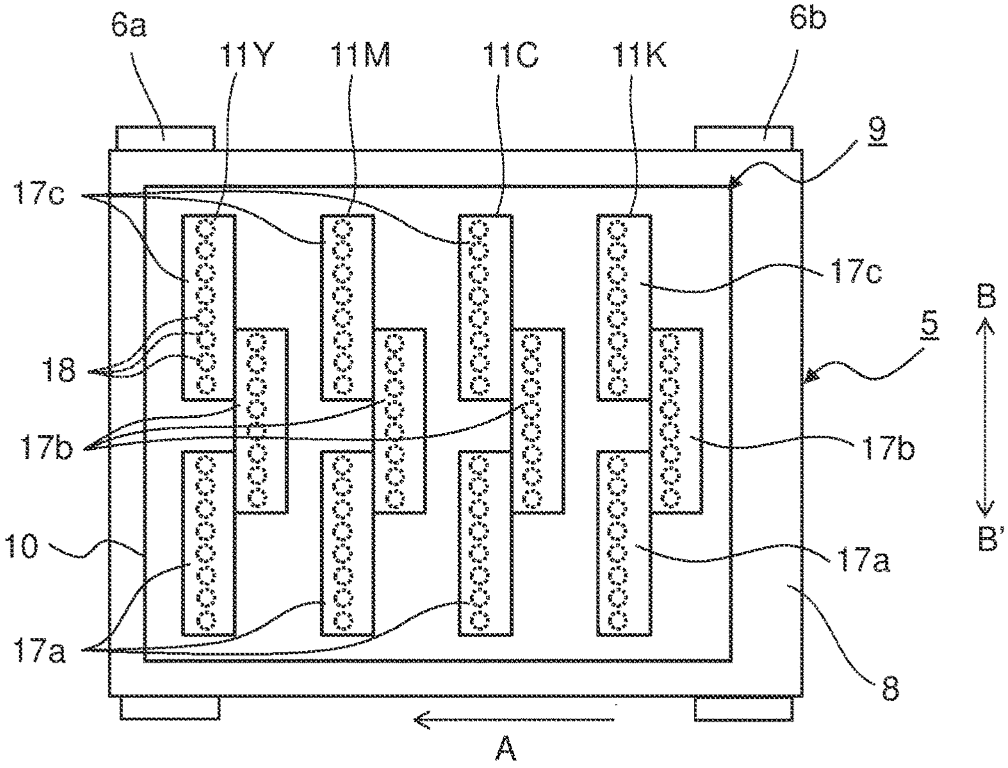
FIG. 4 is a plan view of a recording portion.

FIG. 4 is a plan view of the recording portion 9. As shown in FIGS. 2 and 4, the recording portion 9 includes a head housing 10, line heads 11Y, 11M, 11C, and 11K, and ink receiving portions 31Y, 31M, 31C, and 31K. The line heads 11Y to 11K are held in the head housing 10. The line heads 11Y to 11K are held at such positions that a predetermined interval (for example, 1 mm in an up-down direction in FIG. 2) is left with respect to a surface of the first conveyance belt 8.

The line heads 11Y to 11K each include a plurality of (here, three) recording heads 17*a* to 17*c*. The recording heads 17*a* to 17*c* are arranged in a staggered manner along the sheet width direction, which is perpendicular to the sheet conveyance direction. The recording heads 17*a* to 17*c* each include a plurality of ink ejection ports 18 (nozzles). The ink ejection ports 18 are arranged at regular intervals in a recording-head width direction (the sheet width direction).

The line heads 11Y to 11K eject ink of a corresponding one of yellow (Y), magenta (M), cyan (C), and black (K) via the ink ejection ports 18 of the recording heads 17*a* to 17*c*.

The ink receiving portions 31Y to 31K are disposed at positions opposed to the recording heads 17*a* to 17*c* of the line heads 11Y to 11K via the first conveyance belt 8. To the ink receiving portion 31Y to 31K, a waste ink tank (of which illustration is omitted) is connected. The ink receiving portions 31Y, 31M, 31C, and 31K collect ink ejected from the recording heads 17*a* to 17*c* and convey the collected ink into the waste ink tank.

The recording portion 9 is capable of executing flushing. Flushing means ejecting ink through the ink ejection ports 18 with timing different from timing that contributes to image formation on a paper sheet P. Flushing is executed for the purpose of reducing or preventing clogging of the ink ejection ports 18 with dried ink. During the execution of flushing, with timing when the ink ejection ports 18 of the recording heads 17*a* to 17*c* come to be opposed to the detection holes 42, the recording portion 9 ejects ink through the ink ejection ports 18 such that the ink passes through the detection holes 42 to enter the ink receiving portion 31Y to 31K.

With respect to the sheet width direction, the line heads 11Y to 11K (the recording heads 17*a* to 17*c*) have a smaller width than the detection holes 42. The detection holes 42 are arrayed such that, in a state where the flushing regions FR have reached positions that are opposed to the line heads 11Y to 11K, the ink ejection ports 18 of the recording heads 17*a* to 17*c* are each opposed to one of the detection holes 42. Thus, when the recording heads 17*a* to 17*c* execute flushing, ink ejected from each of the ink ejection ports 18 of the recording heads 17*a* to 17*c* passes through one of the detection holes 42 without fail.

Next, the thickness detection mechanism 41 will be described. The thickness detection mechanism 41 is capable of detecting a thickness of a paper sheet P. The thickness detection mechanism 41 is configured by including the detection holes 42 described above, a thickness detection reference roller 43 (a thickness detection reference member), and an interval detection sensor 44.

The interval detection sensor 44 is an optical displacement meter (an optical sensor employing so-called a diffuse reflection method or a specular reflection method, etc.) capable of measuring an interval between itself and an opposing object. As shown in FIGS. 2 and 3, the interval detection sensor 44 is disposed at a position that is, with respect to the sheet conveyance direction, downstream of the recording portion 9 (downstream of the line head 11Y which is the most-downstream one of the line heads 11Y to 11K)

but is upstream of the second conveyance unit 12. The interval detection sensor 44 is opposed to the first conveyance belt 8.

The interval detection sensor 44 is located at a position that overlaps with one of the detection holes 42 with respect to the sheet width direction. Thus, when the first conveyance belt 8 runs, the interval detection sensor 44, at a predetermined position, is opposed to one of the detection holes 42.

Figure 5:
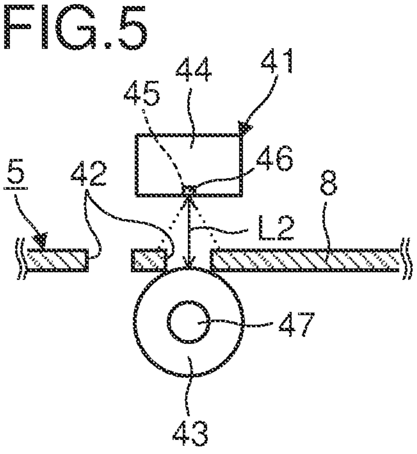
FIG. 5 is a partial side view of and around an interval detection sensor in the first conveyance unit, showing a state where the interval detection sensor is opposed to a detection hole.

FIG. 5 is a partial side view of and around the interval detection sensor 44 in the first conveyance unit 5. As shown in FIGS. 3 and 5, the interval detection sensor 44 includes a light reception portion 45 and a light emission portion 46. The light emission portion 46 emits a light beam toward the first conveyance belt 8. The light reception portion 45 receives the light beam emitted from the light emission portion 46 and reflected from the first conveyance belt 8 or the thickness detection reference roller 43.

The interval detection sensor 44 is capable of detecting the detection holes 42 based on a light reception state (for example, intensity of the received light beam) of the light reception portion 45. The interval detection sensor 44 is also capable of detecting, based on the light reception state of the light reception portion 45, a first opposition interval L1 to the first conveyance belt 8 and a second opposition interval L2 to the thickness detection reference roller 43, which will be described later.

The thickness detection reference roller 43 is a roller supported to be rotatable along a circumferential direction of a center shaft 47. The center shaft 47 of the thickness detection reference roller 43 extends parallel to the sheet width direction. The thickness detection reference roller 43 is located inside the first conveyance belt 8 (see FIG. 2). The thickness detection reference roller 43 is opposed to the interval detection sensor 44 with the first conveyance belt 8 therebetween.

An outer circumferential surface of the thickness detection reference roller 43 is in contact with the inner circumferential surface of the first conveyance belt 8. Opposite ends of the thickness detection reference roller 43 with respect to the sheet width direction are located outside of opposite ends of the first conveyance belt 8 with respect to the sheet width direction. That is, at a position of contact with the thickness detection reference roller 43, the inner circumferential surface of the first conveyance belt 8 is in contact with the thickness detection roller 43 over an entire region in the sheet width direction. When the first conveyance belt 8 runs, the thickness detection reference roller 43 rotates following the first conveyance belt 8.

As shown in FIG. 5, with the interval detection sensor 44 opposed to a detection hole 42, a light beam emitted from the light emission portion 46 passes through the detection hole 42 to be reflected on the outer circumferential surface of the thickness detection reference roller 43, and enters the light reception portion 45. Based on the light reception state of the light reception portion 45 at this time, the interval detection sensor 44 detects that itself is opposed to the detection hole 42, and is capable of detecting the second opposing interval L2. Here, the second opposition interval L2 is detected with reference to such part of the outer circumferential surface of the thickness detection reference roller 43 as is closest to the interval detection sensor 44.

Figure 6:
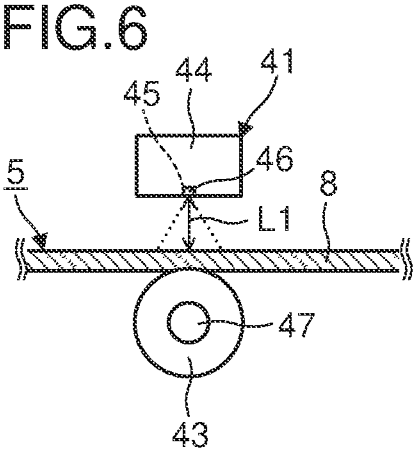
FIG. 6 is a partial side view of and around the interval detection sensor in the first conveyance unit, showing a state where the interval detection sensor is not opposed to the detection hole.

FIG. 6 is a partial side view of and around the interval detection sensor 44 in the first conveyance unit 5, showing a state in which the interval detection sensor 44 is opposed to no detection hole 42. From the state shown in FIG. 5, the first conveyance belt 8 runs by a predetermined amount into a state in which the interval detection sensor 44 is opposed to no detection hole 42 (the state shown in FIG. 6), and in this state, the interval detection sensor 44 is capable of detecting the first opposition interval L1 between itself and the first conveyance belt 8.

More specifically, in this state, a light beam emitted from the light emission portion 46 is reflected on the surface of the first conveyance belt 8 to enter the light reception portion 45. Based on the light reception state of the light reception portion 45 at this time, the interval detection sensor 44 detects the first opposition interval L1.

FIG. 7 is a sectional view of the first conveyance belt 8 taken along the sheet conveyance direction. Here, there may be a case as shown in FIG. 7 where the thickness of the first conveyance belt 8 varies at different positions therein in the running direction thereof. Thus, it is preferable to configure such that the first opposition interval L1 is detected based on light reception states of the light reception portion 45 observed at a plurality of positions with respect to the running direction of the first conveyance belt 8.

Specifically, as shown in FIG. 7, a predetermined one of the flushing regions FR will be referred to as a first flushing region FR1, and other flushing regions FR arranged upstream in the belt running direction will be sequentially referred to as a second flushing region FR2 and a third flushing regions FR3. The sheet loading region PR located between the first flushing region FR1 and the second flushing region FR2 will be referred to as a first sheet loading region PR1, the sheet loading region PR located between the second flushing region FR2 and the third flushing region FR3 will be referred to as a second sheet loading region PR2, and the sheet loading region PR located between the third flushing region FR3 and the subsequent flushing region FR (unillustrated) will be referred to as a third sheet loading region PR3.

After the interval detection sensor 44 passes through the first flushing region FR1 with respect to the belt running direction, with the first conveyance belt 8 having run by a predetermined amount, in the first sheet loading region PR1, at positions equally spaced from each other with respect to the sheet conveyance direction, intervals L1*a*, L1*b*, and L1*c* between the interval detection sensor 44 and the first conveyance belt 8 are detected. The interval detection sensor 44 stores, in the storage portion 28, the intervals L1*a* to L1*c* as intervals between itself and the first conveyance belt 8 detected at a plurality of positions in the first sheet loading region PR1. Next, the control device 110 (an interval detection portion 110*d*, which will be described later) calculates an average value of the intervals L1*a* to L1*c* stored in the storage portion 28. The control device 110 stores this average value in the storage portion 28 as the first opposition interval L1 of the first sheet loading region PR1.

The first opposition interval L1 in each of the second and third sheet loading regions PR2 and PR3 is also calculated in the same manner and stored in the storage portion 28. Further, the control device 110 calculates thicknesses of other sheet loading regions PR in the same manner in addition to the thicknesses of the first to third sheet loading regions PR1 to PR3, and thereby calculates thickness distribution of the first conveyance belt 8 in one rotation thereof, and stores the calculated thickness distribution in the storage portion 28.

The storage portion 28 is a memory that stores an operation program for the control device 110 and various kinds of information. The storage portion 28 is configured by including a read only memory (ROM), a random-access memory (RAM), a nonvolatile memory, and the like (of which illustration is omitted). The storage portion 28 is capable of storing detection results of the interval detection sensor 44 (values of the second opposition interval L2 and the first opposition interval L1) and thicknesses (the thickness distribution) of the first conveyance belt 8 along a circumference thereof calculated by the control device 110.

Further, in the storage portion 28, various setting values are stored in advance. For example, in the storage portion 28, a positional relationship (hereinafter referred to as "phase information") between the reference position detection hole 32 and the plurality of detection holes 42 is stored in advance. Further, in the storage portion 28, the reference thickness and the reference linear speed of the first conveyance belt 8 are also stored in advance.

Further, in the storage portion 28, there are also stored correction values of the landing timing corresponding to values of the thickness of the first conveyance belt 8 as a data table. These correction values include a timing correction value for correcting the ink ejection timing, a head application voltage correction value for correcting a voltage applied to the recording heads 17*a* to 17*c*, a driving application voltage correction value for correcting a voltage applied to the driving roller 6*a*, and the like.

Figure 8:
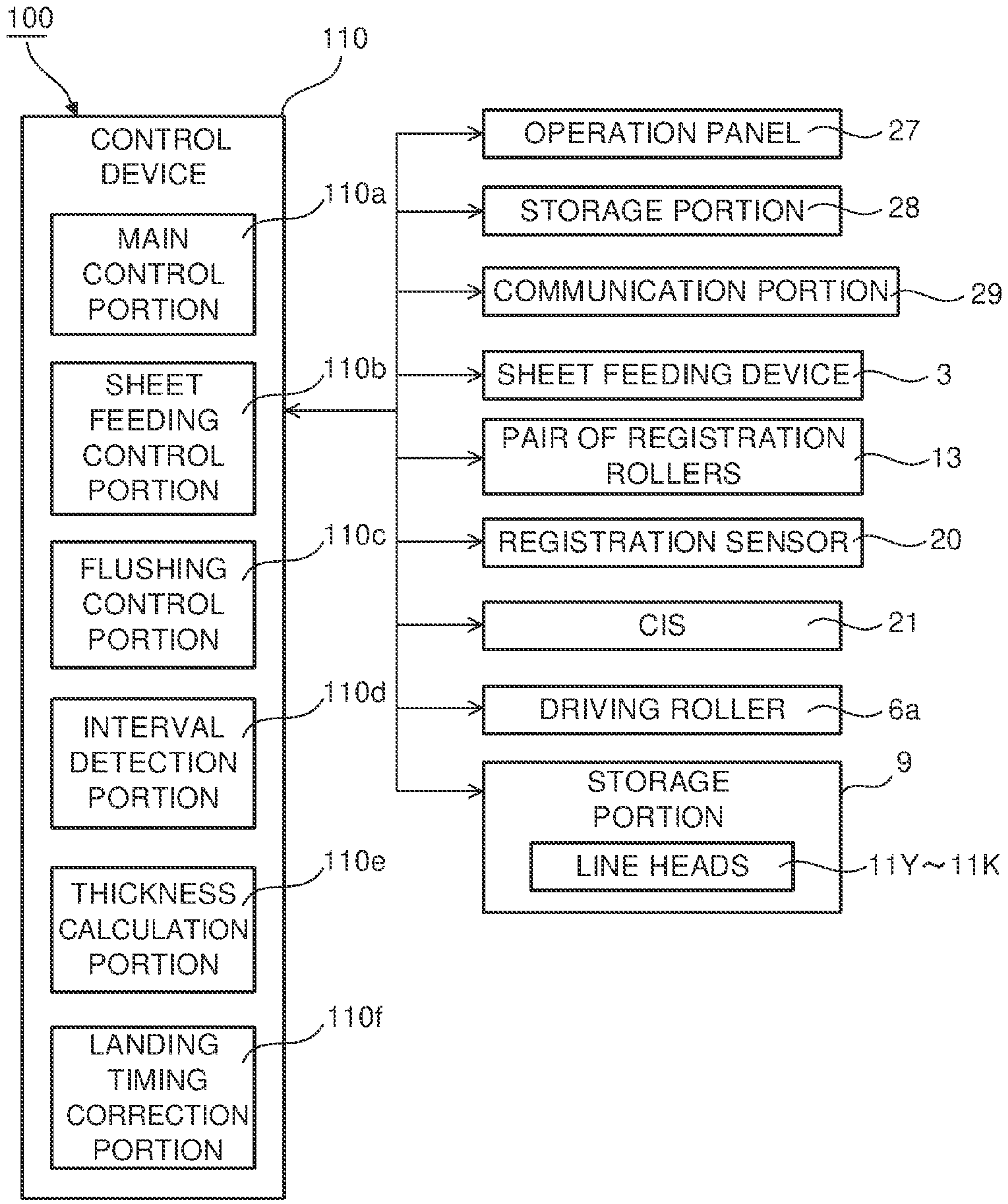
FIG. 8 is a block diagram showing an example of a control path in the printer of the present embodiment.

FIG. 8 is a block diagram showing an example of a control path of the printer 100 of the present embodiment. As shown in FIG. 8, the printer 100 further includes, in addition to the above configuration, an operation panel 27 (an input portion, a display portion) and a communication portion 29.

The operation panel 27 is an operation portion (the input portion) via which to input various settings, printing information, etc. The operation panel 27 also has a function as a notification device (the display portion) that makes a notification regarding an operation state of the printer 100.

The communication portion 29 is a communication interface for transmitting and receiving information to and from an external device (a host device such as a personal computer, for example). When a printing command is transmitted form the external device along with image data, the printing command and the image data are fed via the communication portion 29 to the printer 100. In the printer 100, a main control portion 110*a* controls the recording heads 17*a* to 17*c* based on the image data to cause them to eject ink, and thereby an image can be formed on a paper sheet P.

Next, the control device 110 will be described. The control device 110 is configured by including a central processing unit (CPU) and a memory, for example. Specifically, the control device 110 includes, as shown in FIG. 8, the main control portion 110*a*, a sheet feeding control portion 110*b*, a flushing control portion 110*c*, the interval detection portion 110*d*, a thickness calculation portion 110*e*, and a landing timing correction portion 110*f*. Further, the control device 110 is electrically connected to various devices (see FIG. 8) of the printer 100, and is configured to be capable of controlling operations of various portions of the printer 100.

The main control portion 110*a* controls driving of various rollers provided inside the printer 100, driving of the driving roller 6*a* (the paper-sheet-P conveyance speed), ejection of ink from the line heads 11C to 11K during image formation, etc. The main control portion 110*a* calculates the landing timing of ink in a case where the first conveyance belt 8 is at the reference linear speed (hereinafter referred to as "reference landing timing").

The sheet feeding control portion 110*b* controls the pair of registration rollers 13 and the sheet feeding device 3. For example, the sheet feeding control portion 110*b* controls the pair of registration rollers 13 based on detection timing of a rear end of a paper sheet P by a CIS (Contact Image Sensor) 21, and thereby controls conveying timing of a following paper sheet P. The flushing control portion 110*c* controls the recording portion 9 and the first conveyance unit 5 to have flushing executed.

The interval detection portion 110*d* is capable of executing an interval detection mode. The interval detection mode is a mode in which the second opposition interval L2 and the first opposition interval L1 are detected.

The thickness calculation portion 110*e* is capable of executing a thickness calculation mode. The thickness calculation mode is a mode in which the thickness of the first conveyance belt 8 is calculated. When the thickness calculation mode is executed, the thickness calculation portion 110*e* calculates a difference value between the second opposition interval L2 and the first opposition interval L1 that are stored in the storage portion 28. Let this difference value be the thickness of the first conveyance belt 8. Flows of control in the interval detection mode and the thickness calculation mode will be described later.

The landing timing correction portion 110*f* is capable of executing a landing timing correction mode. The landing timing correction mode is a mode in which image formation is performed with respect to a paper sheet P while correcting the landing timing of ink onto the paper sheet P. The correction of the landing timing can be performed by changing the ink ejection timing, by changing the ink ejection speed, or by changing the conveyance speed of the paper sheet P.

In a case of changing the ink ejection timing, the ink ejection timing is adjusted based on the timing correction value stored in the storage portion 28. In a case of changing the ink ejection speed, based on the head application voltage correction value stored in the storage portion 28, an application voltage applied to the recording heads 17*a* to 17*c* is adjusted. In a case of changing the conveyance speed of the paper sheet P, based on the driving application voltage correction value stored in the storage portion 28, the rotation speed of the driving roller 6*a* and thus the running speed of the first conveyance belt 8 are adjusted.

Next, an example of control of the printer 100 of the present embodiment will be described with reference to the flow chart shown in FIG. 9. Note that, although the printer 100 is capable of executing various operations and a control flow is set for each of the various operations, the following description will focus on the control flows related to the interval detection mode and the landing timing correction mode.

Figure 9:
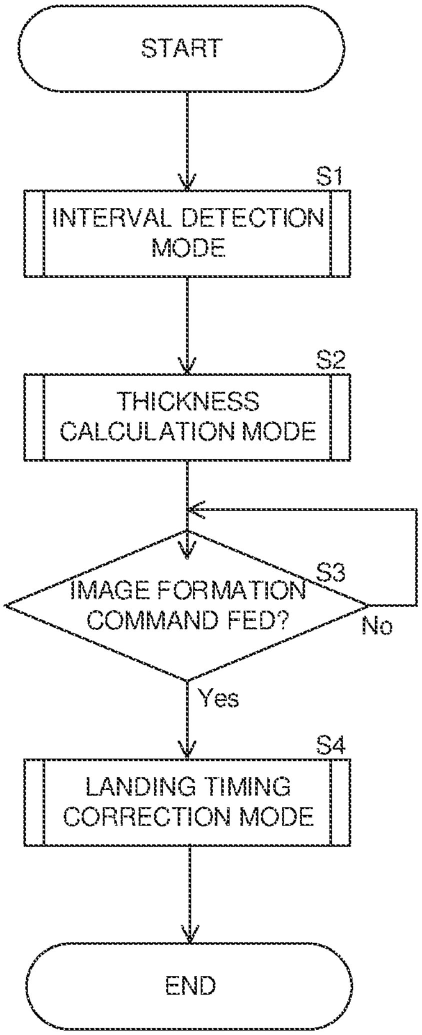
FIG. 9 is a flow chart showing an example of part of a control flow of the printer of the present embodiment.

FIG. 9 is a flow chart showing an example of part of a control flow of the printer 100 of the present embodiment. As shown in FIG. 9, after power is turned on, the control device 110 first executes the interval detection mode, along with a startup operation (of which illustration is omitted) such as making settings of various portions of the printer 100 (step S1).

Next, the thickness calculation mode is executed (step S2). Next, it is determined whether or not an image formation command has been fed from a host device such as a personal computer (step S3). In a case where no image formation command has been fed (No in step S3), no image formation is performed, and a standby state is continuously maintained until an image formation command is fed.

When an image formation command is fed (Yes in step S3), the landing timing correction mode is executed, and image formation is performed based on information in the fed image formation command (step S4). On completion of the image formation based on the information in the image formation command, the control of the printer 100 is finished.

Figure 10:
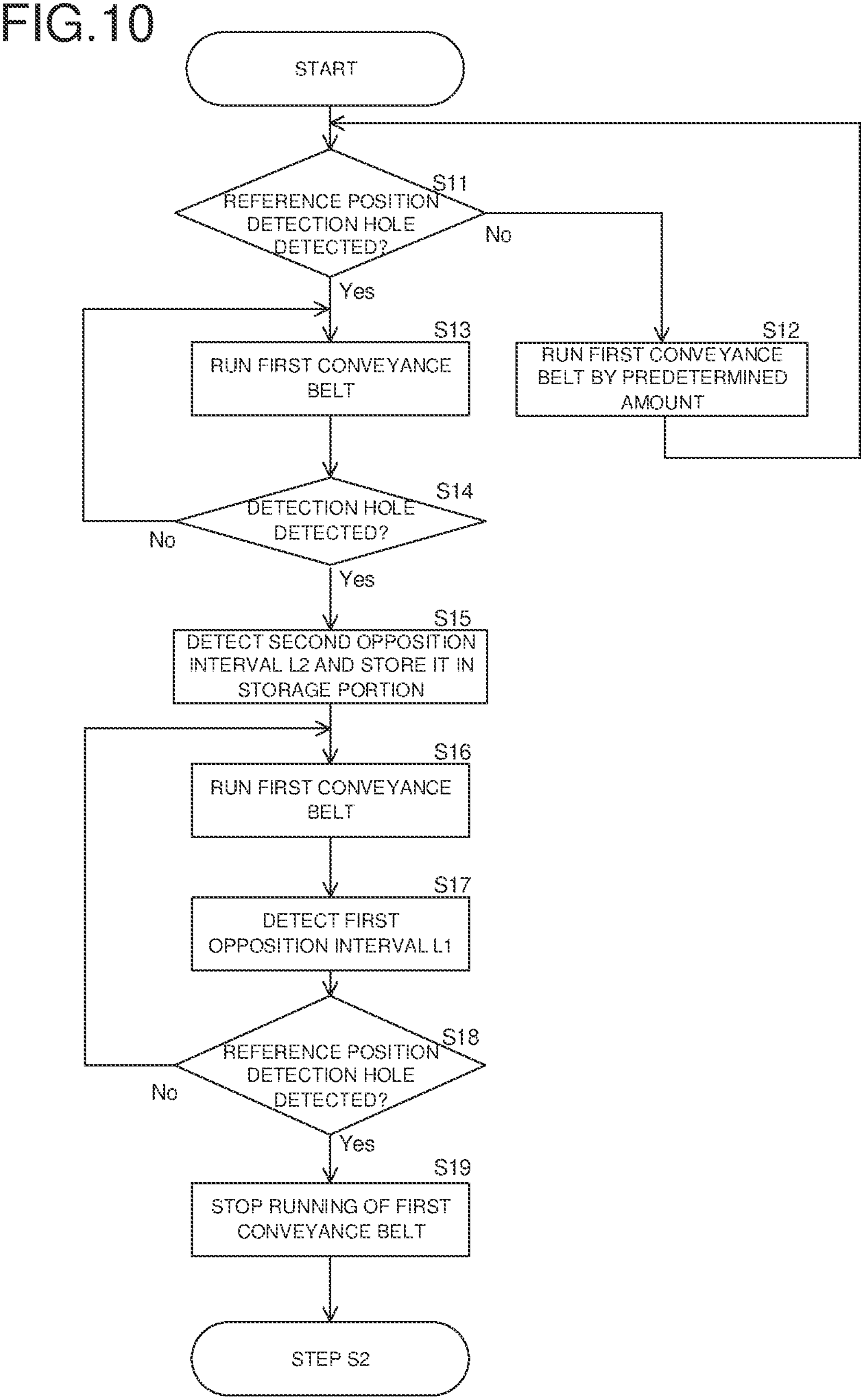
FIG. 10 is a flow chart showing a control flow in an interval detection mode.

Next, with reference to FIG. 10, a description will be given of a control flow in the interval detection mode. FIG. 10 is a flow chart showing the control flow in the interval detection mode. As shown in FIG. 10, first, it is determined whether or not the belt sensor 24 has detected the reference position detection hole 32 (step S11). In a case where the belt sensor 24 has not detected the reference position detection hole 32 (No in step S11), the first conveyance belt 8 is caused to run (step S12), and steps S11 and S12 are repeated until the belt sensor 24 detects the reference position detection hole 32.

When the belt sensor 24 detects the reference position detection hole 32 (Yes in step S11), based on the phase information stored in the storage portion 28, the first conveyance belt 8 continues to be run until one of the flushing regions FR reaches the position that is opposed to the interval detection sensor 44 (step S13).

Next, it is determined whether or not the interval detection sensor 44 has detected one of the detection holes 42 (whether or not the interval detection sensor 44 is in a state capable of detecting the second opposition interval L2) (step S14). In a case where the interval detection sensor 44 has detected one of the detection holes 42 (Yes in step S14), the second opposition interval L2 is detected and stored in the storage portion 28 (step S15).

In a case where the interval detection sensor 44 has not detected one of the detection holes 42 (No in step S14), the first conveyance belt 8 continues to be run in the same direction and steps S13 and S14 are repeated until one of the detection holes 42 is detected.

Next, the first conveyance belt 8 continues to be run until one of the sheet loading regions PR that is located next to the one of the detection holes 42 on an upstream side thereof in the belt running direction reaches the position that is opposed to the interval detection sensor 44 (step S16). Then, with the first conveyance belt 8 continuously running, the first opposition interval L1 is detected (step S17). Note that, in step S17, as described above, intervals (the intervals L1*a* to L1*c* shown in FIG. 8) are detected between the interval detection sensor 44 and the first conveyance belt 8 at different positions in the belt running direction, and an average value of these intervals is detected as the first opposition interval L1.

Next, it is determined whether or not the belt sensor 24 has detected the reference position detection hole 32 (step S18). In a case where the reference position detection hole 32 has not been detected (No in step S18), the flow returns to step S16, where the first conveyance belt 8 continues to be run, and detection is performed of the first opposition interval L1 of each of the sheet loading regions PR arranged on the upstream side in the belt running direction. Until the reference position detection hole 32 is detected in step S18, that is, until the first conveyance belt 8 rotates once from a state where the reference position detection hole 32 is detected for the first time in step S11, the steps from step S16 through step S18 are repeated. Thereby, first opposition intervals L1 of all the sheet loading regions PR are detected. The first opposition intervals L1 of all the sheet loading regions PR are separately stored in the storage portion 28.

When the reference position detection hole 32 is detected in step S18 (Yes in step S18), the first conveyance belt 8 is caused to stop running, with the belt sensor 24 and the reference position detection hole 32 opposed to each other (step S19), and the interval detection mode is finished.

Figure 11:
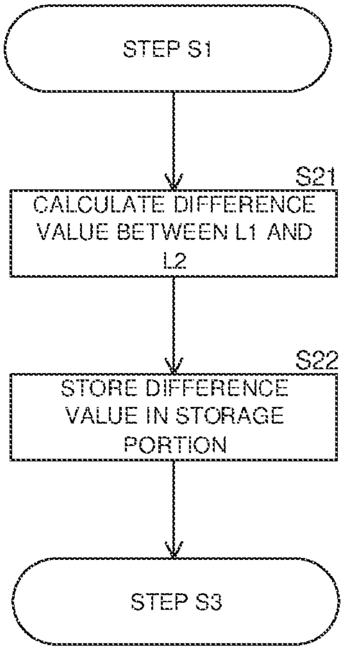
FIG. 11 is a flow chart showing a control flow in a thickness detection mode.

Next, with reference to FIG. 11, a description will be given of a control flow in the thickness calculation mode. FIG. 11 is a flow chart showing the control flow in the thickness calculation mode. As shown in FIG. 11, in the thickness calculation mode, first, a difference value between the second opposition interval L2 and the first opposition interval L1 that are stored in the storage portion 28 is calculated (step S21). Here, as described above, in the storage portion 28, as the first opposition interval L1, first opposition intervals L1 of all the sheet loading regions PR are stored. Thus, as the difference value, a plurality of difference values are calculated, one with each of first opposition intervals L1. Next, the plurality of difference values thus calculated are stored in the storage portion 28 as thicknesses of the first conveyance belt 8 (step S22). In this manner, the thicknesses detected in the sheet loading regions PR are stored in the storage portion 28. Then, the thickness calculation mode is finished.

Figure 12:
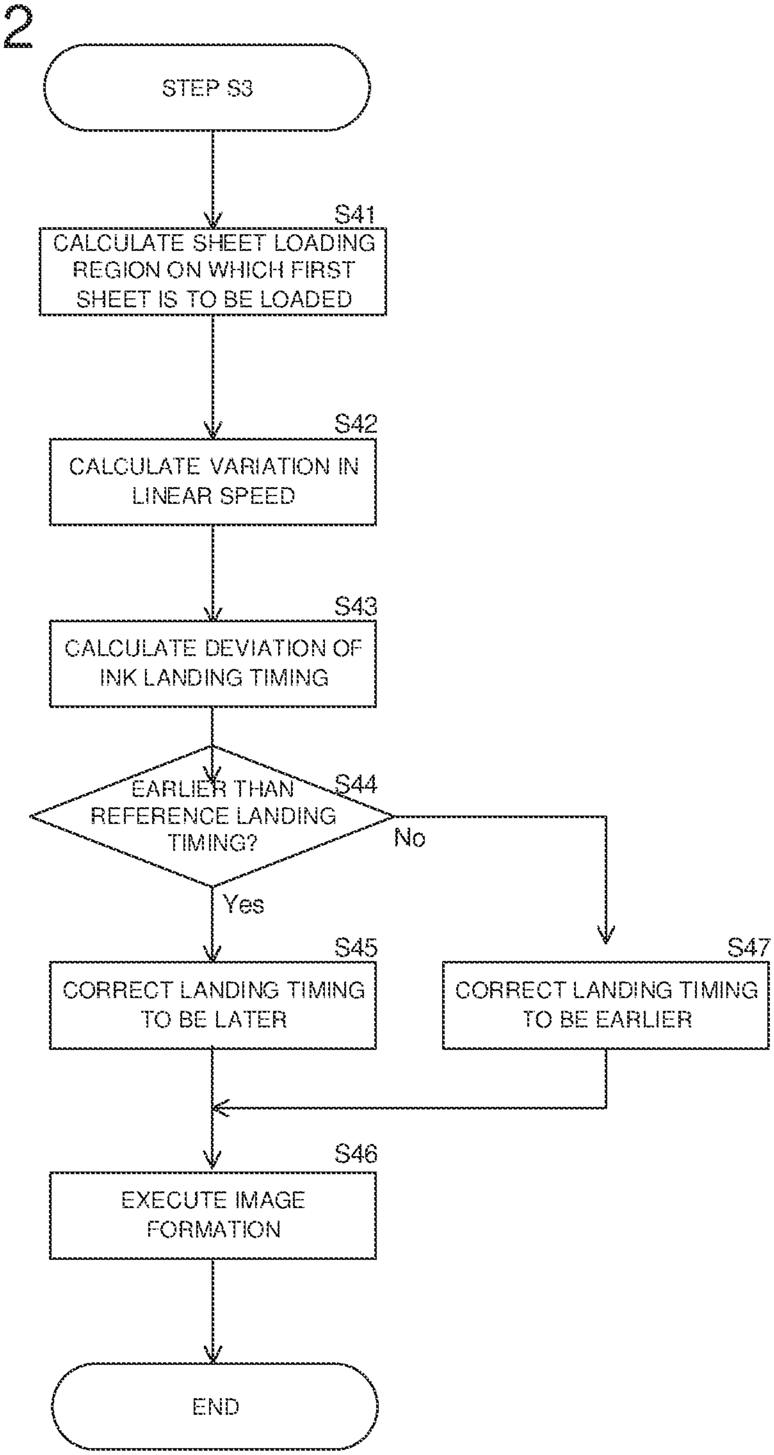
FIG. 12 is a flow chart showing a control flow in a landing timing correction mode.

Next, with reference to FIG. 12, a description will be given of the landing timing correction mode. FIG. 12 is a flow chart showing a control flow in the landing timing correction mode. In the landing timing correction mode, first, one of the sheet loading regions PR on which a paper sheet P onto which ink is to be first ejected is to be loaded (here, let the first sheet loading region PR1 be the one of the sheet loading regions PR) is calculated (step S41).

Next, based on the thicknesses of all the sheet loading regions PR stored in the storage portion 28 (the thickness distribution of the first conveyance belt 8), variation is calculated in the linear speed of the first conveyance belt 8 from a start of running of the first conveyance belt 8 until the first sheet loading region PR1 reaches a position opposed to the ink ejection ports 18 (step S42). Note that, as described above, in a case where the thickness of one of the sheet loading regions PR that comes into contact with the driving roller 6*a* is larger than the reference thickness, the linear speed of the first conveyance belt 8 increases, that is, the landing timing becomes later than the reference landing timing. Conversely, in a case where the thickness of one of the sheet loading regions PR that comes into contact with the driving roller 6*a* is smaller than the reference thickness, the linear speed of the first conveyance belt 8 decreases, that is, the landing timing becomes earlier than the reference landing timing.

Next, based on the calculated variation in the linear speed, a deviation of the landing timing of ink onto the paper sheet P is calculated (step S43). Then, it is determined whether or not the landing timing of ink will become earlier than the reference landing timing (step S44). In a case where the landing timing is earlier than the reference landing timing (Yes in step S44), the landing timing of ink is delayed (step S45). More specifically, the landing timing of ink is corrected to be later than the reference landing timing (step S45). Then, image formation is performed with respect to the paper sheet P (step S46).

In a case where the landing riming is later than the reference landing timing (No in step S44), the landing timing of ink is hastened (step S47). More specifically, the landing timing of ink is corrected to be earlier than the reference landing timing (step S47). Then, image formation is performed with respect to the paper sheet P (step S46).

The interval detection mode and the thickness calculation mode allow the printer 100 of the present embodiment to calculate the thickness of the first conveyance belt 8 at each belt running position. Furthermore, the landing timing correction mode allows the printer 100 to correct the landing timing of ink corresponding to the variation in the thickness of the first conveyance belt 8. Thus, even if unevenness has occurred in the thickness of the first conveyance belt 8 to cause the linear speed of the first conveyance belt 8 to vary, it is possible to correct the landing timing of ink corresponding to the unevenness in the thickness, and thus to suppress image misalignment. Accordingly, it is possible to provide an inkjet recording apparatus that is capable of suitably suppressing image failure.

Further, the first opposition interval L1 of each of the sheet loading regions PR is calculated from the average value of the intervals L1*a* to L1*c* between the interval detection sensor 44 and the first conveyance belt 8 measured at the plurality of positions. Thus, even in a case where the unevenness in the thickness of the first conveyance belt 8 results from short-period variation, the first opposition interval L1 of each of the sheet loading regions PR can be detected with increased accuracy. Thus, it is possible to detect unevenness in the thickness of the first conveyance belt 8 with increased accuracy to thereby achieve more accurate correction of the landing timing.

Further, each time power is turned on, before execution of image formation, the interval detection mode and the thickness calculation mode are executed. Thus, even if variation has occurred in the thickness of the first conveyance belt 8 due to aging or usage conditions, it is possible to detect unevenness in the thickness of the first conveyance belt 8 with accuracy.

Further, with the belt sensor 24, it is possible to detect the phase (the position in the running direction) of the first conveyance belt 8. Thus, it is possible to detect at which positions in the first conveyance belt 8 with respect to the running direction the first opposition intervals L1 have been detected by the interval detection sensor 44. This makes it possible to calculate the thickness of the first conveyance belt 8 with respect to each of various positions in the running direction, and thus to calculate variation in the linear speed of the first conveyance belt 8.

Next, a printer 100 of a second embodiment will be described. The following description will focus on differences from the first embodiment, and components similar to their counterparts in the first embodiment are denoted by the same reference signs as in the first embodiment, and overlapping descriptions will be omitted.

Figure 13:
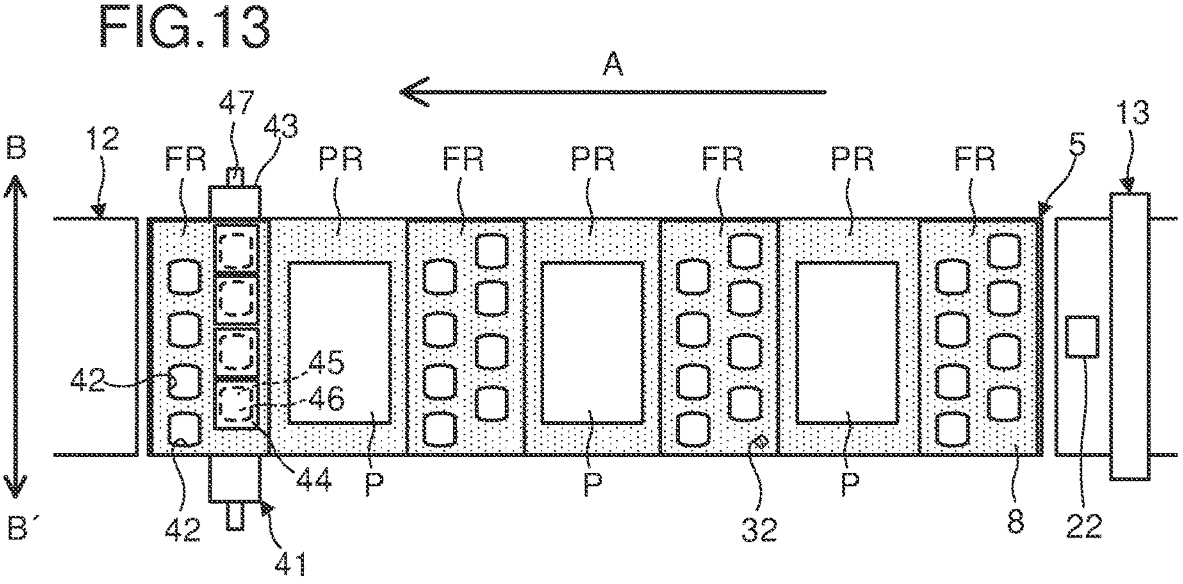
FIG. 13 is a plan view of a surface of a first conveyance belt of a printer according to a second embodiment, as seen from the front.

As shown in FIG. 13, the interval detection sensor according to the printer 100 of the present embodiment includes a plurality of interval detection sensors 44. The interval detection sensors 44 are arranged in line along the sheet width direction. The interval detection sensors 44 are each opposed to one of the detection holes 42.

As a result, when the interval detection mode is executed, it is possible, while the first conveyance belt 8 rotates one rotation, to calculate the first opposition interval L1 at each of a plurality of positions in the first conveyance belt 8 with respect to the sheet width direction. This makes it possible to calculate, at the plurality of positions in the first conveyance belt 8 with respect to the sheet width direction, unevenness in the thickness of the first conveyance belt 8, that is, variation in the linear speed of the first conveyance belt 8. Accordingly, the landing timing can be corrected separately with respect to each of the recording heads 17*a* to 17*c*. Further, since unevenness in the thickness of the first conveyance belt 8 can be calculated at the plurality of positions in the sheet width direction while the first conveyance belt 8 rotates just one rotation, it is possible to reduce time taken to execute the thickness calculation mode.

Next, a printer 100 of a third embodiment will be described. The following description will focus on differences from the first embodiment, and components similar to their counterparts in the first embodiment are denoted by the same reference signs as in the first embodiment, and overlapping descriptions will be omitted.

Figure 14:
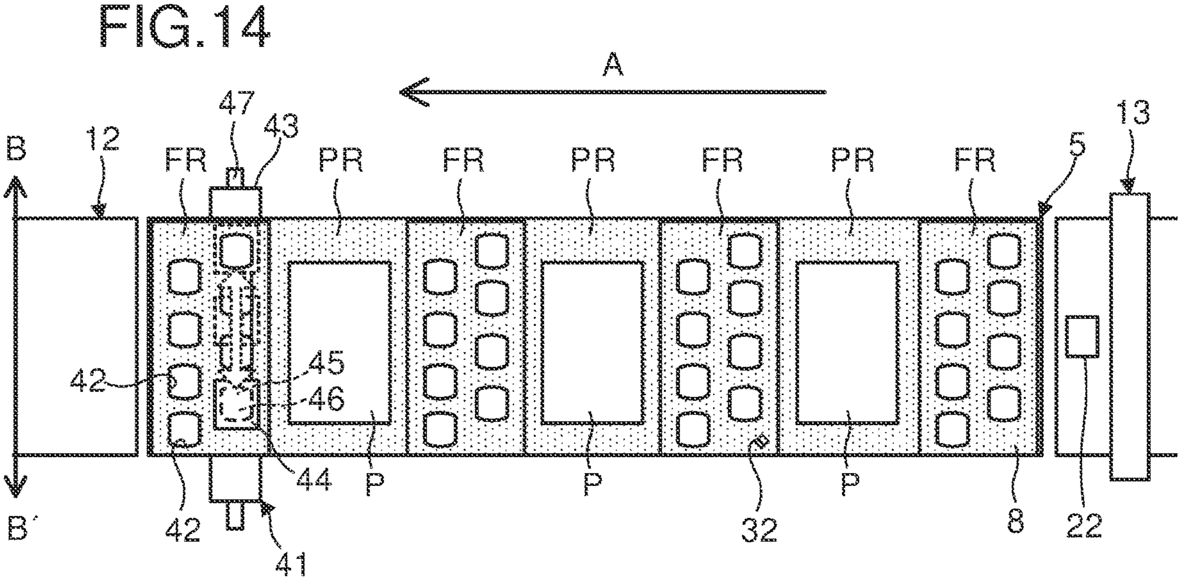
FIG. 14 is a plan view of a surface of a first conveyance belt of a printer according to a third embodiment as seen from the front.

As shown in FIG. 14, the interval detection sensor 44 according to the printer 100 of the present embodiment is supported in the printer main body 1 so as to be slidable in the sheet width direction. The interval detection sensor 44 is capable of sliding in the sheet width direction to be opposed to such one of the detection holes 42 as is located outermost in the sheet width direction.

When the interval detection mode is executed, each time the first conveyance belt 8 rotates one rotation, the interval detection sensor 44 is caused to slide with respect to the sheet width direction. This makes it possible to calculate the first opposition interval L1 at each of a plurality of positions in the first conveyance belt 8 with respect to the sheet width direction, each time the first conveyance belt 8 rotates one rotation. Accordingly, as in the printer 100 of the second embodiment, the landing timing can be corrected separately with respect to each of the recording heads 17*a* to 17*c*. Further, since it is possible, by using the single interval detection sensor 44, to calculate unevenness in the thickness of the first conveyance belt 8 at the plurality of positions in the sheet width direction, it is possible to reduce the number of components and thus to suppress cost increase.

Next, a printer 100 of a fourth embodiment will be described. The following description will focus on differences from the first embodiment, and components similar to their counterparts in the first embodiment are denoted by the same reference signs as in the first embodiment, and overlapping descriptions will be omitted.

Figure 15:
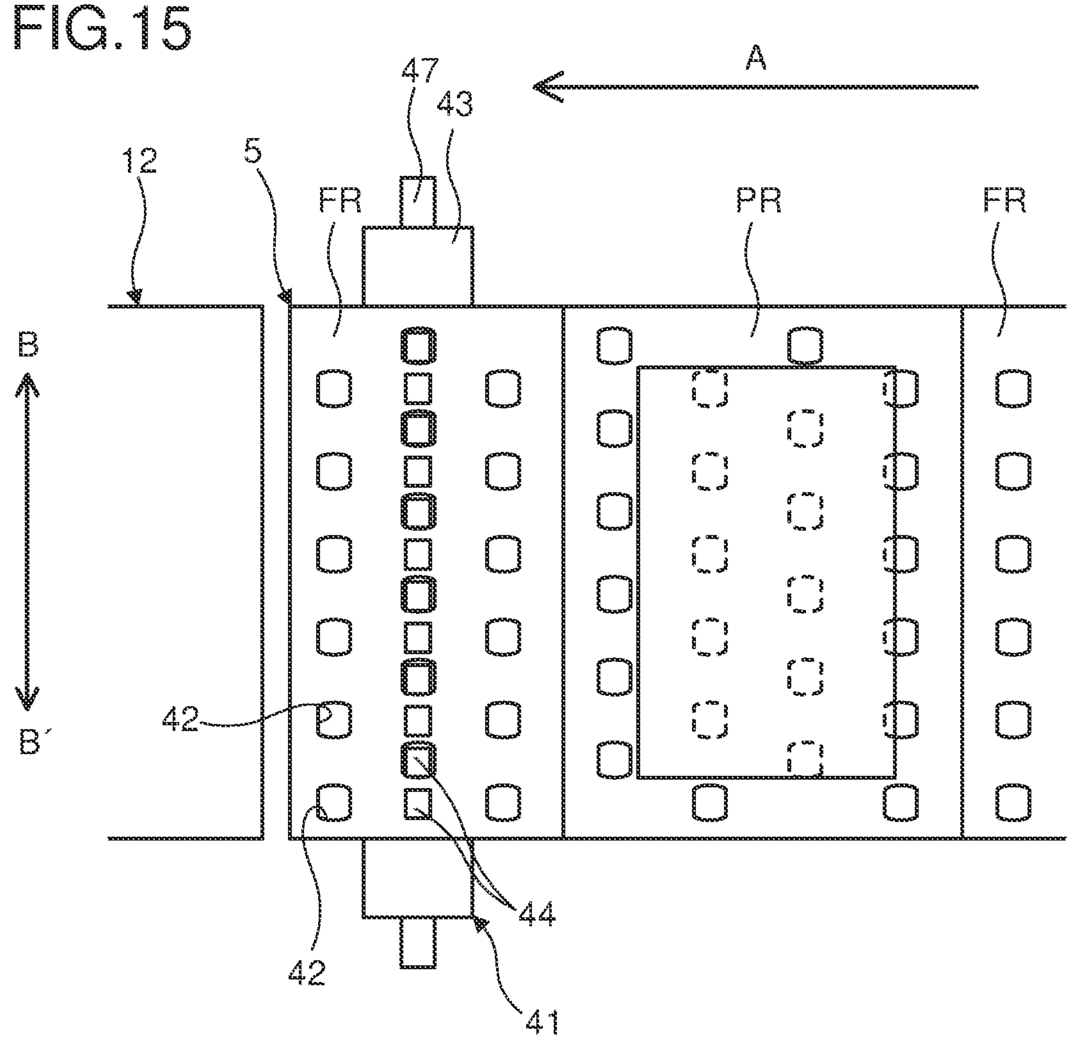
FIG. 15 is a plan view of a surface of a first conveyance belt of a printer according to a fourth embodiment as seen from the front.

As shown in FIG. 15, the detection holes 42 according to the printer 100 of the present embodiment are formed over an entire region (all the flushing regions FR and the sheet loading regions PR) of the first conveyance belt 8 with respect to the sheet conveyance direction.

The plurality of interval detection sensor 44 includes a plurality of interval detection sensors 44 arranged in line in the sheet width direction. Of the interval detection sensors 44, those located at positions overlapping with the detection holes 42 arranged in line along the sheet width direction and those located at positions between adjacent ones of the detection holes 42 are alternately arranged.

With this arrangement, it is possible to detect the second opposition interval L2 over the entire region of the first conveyance belt 8. Further, it is possible, while detecting the second opposition interval L2 based on detection results of the interval detection sensors 44 that are opposed to the detection holes 42, to simultaneously detect the first opposition interval L1 based on detection results of the interval detection sensors 44 that are not opposed to the detection holes 42. Thus, it is possible to reduce time taken to detect the second opposition interval L2 and the first opposition interval L1. Note that, as in the third embodiment, the printer 100 of the present embodiment may employ a configuration in which a single interval detection sensor 44 is supported to be slidable in the sheet width direction.

Next, a printer 100 of a fifth embodiment will be described. The following description will focus on differences from the first embodiment, and components similar to their counterparts in the first embodiment are denoted by the same reference signs as in the first embodiment, and overlapping descriptions will be omitted.

Figure 16:
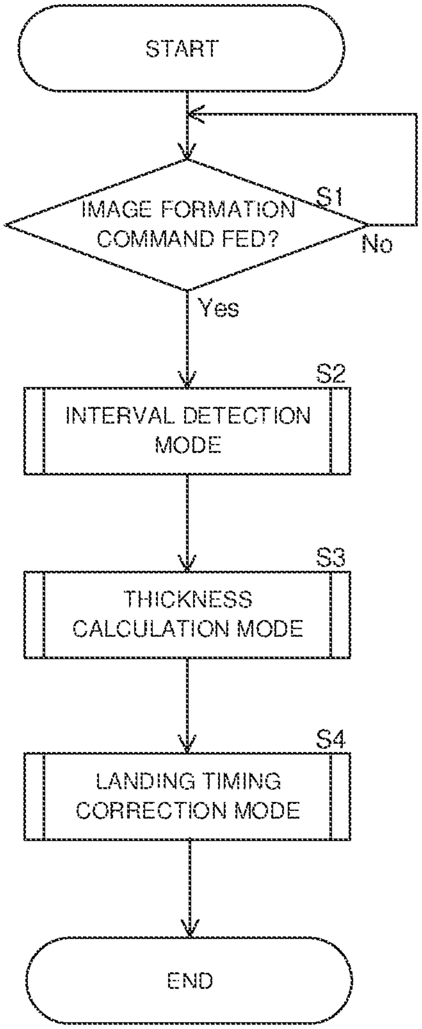
FIG. 16 is a flow chart showing an example of part of a control flow of a printer of a fifth embodiment.

As shown in FIG. 16, the interval detection mode and the thickness calculation mode according to the printer 100 of the present embodiment are executed each time an image formation command is fed. Specifically, first, the main control portion 110*a* determines whether or not an image formation command has been fed from a host device such as a personal computer (step S1). In a case where no image formation command has been fed (No in step S1), no image formation is performed, and a standby state is continuously maintained until an image formation command is fed.

In a case where an image formation command has been fed (Yes in step S1), the main control portion 110*a* executes the interval detection mode (step S2). Then, the thickness calculation mode is executed (step S3), and the landing timing correction mode is executed (step S4).

By employing the configuration of the present embodiment, it is possible to detect unevenness in the thickness of the first conveyance belt 8 each time an image formation command is fed. Thus, even in a case where a long period of time has elapsed in a power-on state since turning on of power and thus variation has occurred in the thickness of the first conveyance belt 8, unevenness in the thickness of the first conveyance belt 8 can be detected with more accuracy, and thus image misalignment can be more suitably suppressed.

It should be understood that the embodiments described above are in no way meant to limit the present disclosure, which thus allows for many modifications and variations within the spirit of the present disclosure. For example, there may be employed a configuration where the interval detection mode and the thickness calculation mode in each of the embodiments described above are executed, in addition to with the timings described above, each time the number of paper sheets P printed reaches a predetermined number. With such a configuration, even in a case where a large amount of printing has been performed and thus variation has occurred in the thickness of the first conveyance belt 8, unevenness in the thickness of the first conveyance belt 8 can be detected with more accuracy, and thus image misalignment can be more suitably suppressed.

Figure 17:
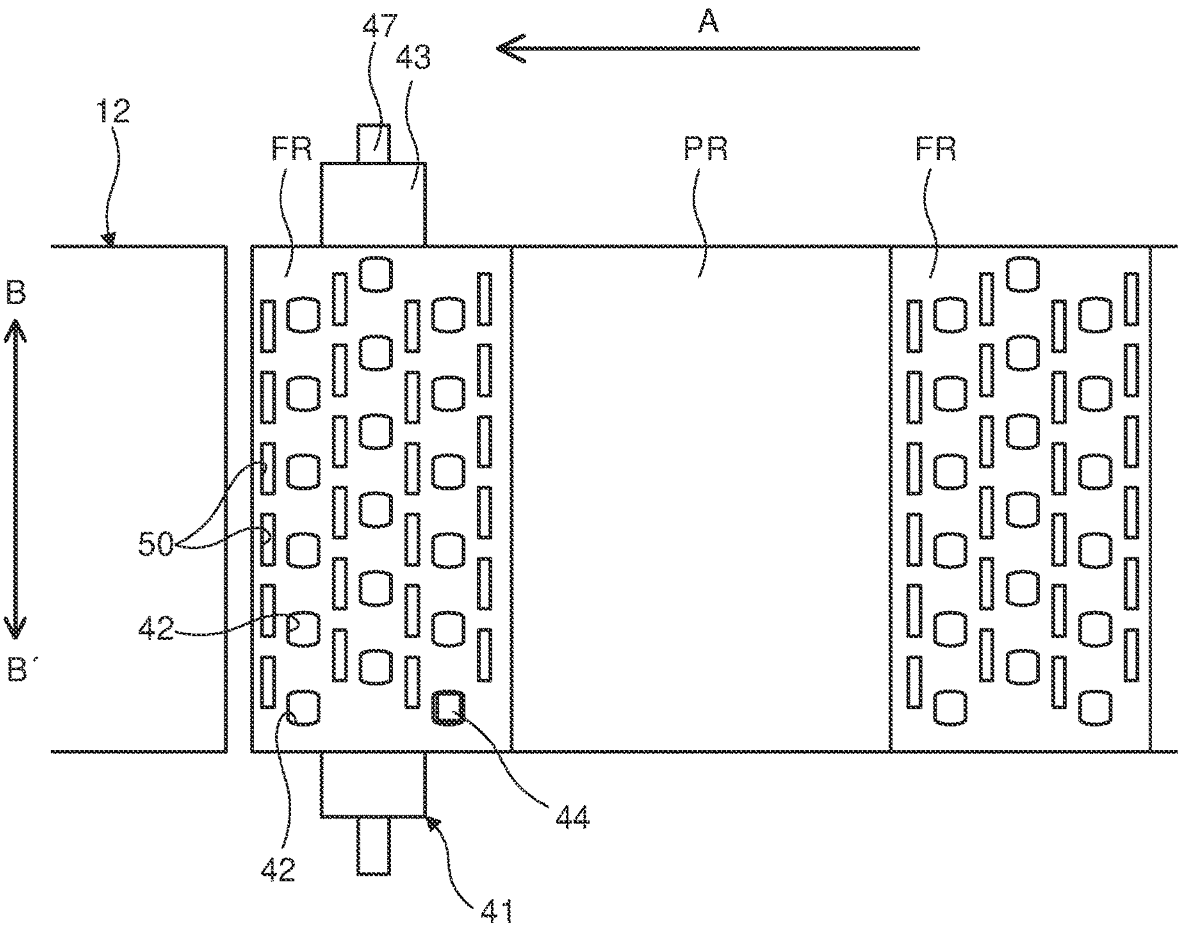
FIG. 17 is a plan view showing a modified example of the printer of each embodiment.

Further, for the flushing regions FR according to the printer 100 of each of the embodiments described above, a configuration may be employed in which, as shown in FIG. 17, separately from the detection holes 42, a plurality of flushing openings 50 are formed. In this case, flushing can be executed such that ink passes through the flushing openings 50.

Further, although the belt sensor 24 is located between the tension roller 7*a* and the tension roller 7*b* in the embodiments described above, the belt sensor 24 may instead be located between the speed detection roller 6*b* and the tension roller 7*b*.

Further, instead of the thickness detection reference roller 43 of each of the embodiments described above, there may be provided a stick-shaped thickness reference member that is unrotatably fixed in the printer main body 1. This thickness reference member is in sliding contact with the inner circumferential surface of the first conveyance belt 8. It is preferable that a contact part of the thickness reference member with the first conveyance belt 8 be arc shaped.

Further, it is possible to employ a configuration in which, instead of by the belt sensor 24, the reference position detection hole 32 is detected by the interval detection sensor 44. In this case, at least one interval detection sensor 44 is disposed at a position that overlaps with the reference position detection hole 32 with respect to the sheet width direction. Further, in this case, it is also possible to detect the second opposition interval L2 through the reference position detection hole 32. In this case, the reference position detection hole 32 is different in shape from the detection holes 42, such that the light reception state of the light reception portion 45 is different between when the reference position detection hole 32 has been detected and when one of the detection holes 42 has been detected. Furthermore, in this case, it is also possible to perform flushing through the reference position detection hole 32.

The present disclosure is usable in an image forming apparatus that employs an inkjet recording method to form an image on a recording medium and that uses a conveyance belt to convey the recording medium to a position opposed to a recording portion. With the present disclosure, even if the linear speed of a conveyance belt varies due to unevenness in the thickness of the conveyance belt, it is possible to correct the landing timing of ink to thereby suppress deviation of ink landing positions, that is, image misalignment. Accordingly, it is possible to provide an image forming apparatus capable of suppressing image failure.

What is claimed is:

1. An inkjet recording apparatus, comprising:

a conveyance belt that is an endless belt and that conveys a recording medium;

a recording head that is opposed to the conveyance belt and that includes a plurality of nozzles that perform image formation by ejecting ink onto the recording medium conveyed by the conveyance belt;

a control portion that controls landing timing of ink ejected from the recording head onto the recording medium;

an interval detection sensor that is disposed opposite the conveyance belt across a predetermined interval and that detects a thickness of the conveyance belt;

a thickness detection reference member that is opposed to the interval detection sensor with the conveyance belt therebetween and that contacts a surface of the conveyance belt on an opposite side of the interval detection sensor; and a storage portion that stores the thickness of the conveyance belt detected by the interval detection sensor, wherein the conveyance belt has formed therein a detection hole that penetrates therethrough at a position overlapping with the thickness detection reference member with respect to a belt width direction perpendicular to a recording-medium conveyance direction, the interval detection sensor is capable of detecting a first opposition interval, which is between the interval detection sensor and the conveyance belt, and a second opposition interval, which is between the interval detection sensor and the thickness detection reference member, via the detection hole, the control portion is capable of executing:

an interval detection mode in which the conveyance belt is caused to rotate and in which the first opposition interval and the second opposition interval are detected;

a thickness calculation mode in which the thickness of the conveyance belt is calculated from a difference value between the first opposition interval and the second opposition interval detected in the interval detection mode and in which the thickness of the conveyance belt is stored in the storage portion; and a landing timing correction mode in which the landing timing is controlled corresponding to the thickness of the conveyance belt stored in the storage portion, in the landing timing correction mode, the control portion sets the landing timing to be equal to reference landing timing when the thickness of the conveyance belt stored in the storage portion is equal to a predetermined reference thickness, sets the landing timing to be earlier than the reference landing timing when the thickness of the conveyance belt stored in the storage portion is larger than the reference thickness, and sets the landing timing to be later than the reference landing timing when the thickness of the conveyance belt stored in the storage portion is smaller than the reference thickness, as the detection hole, a plurality of detection holes are formed in the belt width direction, as the detection sensor, a plurality of detection sensors are disposed at positions each individually overlapping with one of the detection holes in the belt width direction, and in the thickness calculation mode, the control portion is capable of calculating thickness distribution of the conveyance belt in the belt width direction based on a detection result of each of the interval detection sensors, and storing the thickness distribution in the storage portion.

2. The inkjet recording apparatus according to claim 1, further comprising:

a reference hole detection sensor that is opposed to the conveyance belt and that detects a reference hole formed in the conveyance belt to penetrate therethrough, wherein in the interval detection mode, the control portion is capable of detecting a phase of the conveyance belt along the recording-medium conveyance direction based on a detection result of the reference hole detection sensor, in the thickness calculation mode, the control portion calculates thickness distribution of the conveyance belt in the recording-medium conveyance direction based on the phase of the conveyance belt, and stores the thickness distribution in the storage portion, and in the landing timing correction mode, the control portion controls the landing timing corresponding to the thickness distribution stored in the storage portion.

3. The inkjet recording apparatus according to claim 2, wherein opposition positions at which the interval detection sensor and the reference hole detection sensor are opposed to the conveyance belt are different from each other in the recording-medium conveyance direction and overlap with each other in the belt width direction, and the reference hole and the detection hole are one and a same hole.

4. The inkjet recording apparatus according to claim 2, wherein in the interval detection mode, the control portion detects, as the first opposition interval, first opposition intervals at a plurality of positions with respect to the recording-medium conveyance direction by using the interval detection sensor, and in the thickness calculation mode, the control portion calculates the thickness of the conveyance belt from a difference value between an average value of the first opposition intervals and the second opposition interval.

5. The inkjet recording apparatus according to claim 1, wherein the control portion changes at least one of a conveyance speed of the recording medium conveyed by the conveyance belt and timing of ink ejection from the recording head, to thereby control the landing timing.

6. The inkjet recording apparatus according to claim 1, wherein in the interval detection mode, the control portion sets a moving speed of the conveyance belt to be lower than the moving speed of the conveyance belt during image formation.

7. The inkjet recording apparatus according to claim 1, wherein the conveyance belt has formed therein a plurality of flushing openings with respect to the recording-medium conveyance direction and with respect to the belt width direction, the control portion is capable of executing flushing, in which the ink is ejected from each of the nozzles so as to pass through one of the plurality of flushing openings, with timing different from timing contributing to image formation, and at least part of the flushing openings function also as the detection hole.

8. The inkjet recording apparatus according to claim 7, wherein the conveyance belt has disposed therein a flushing region, in which the plurality of flushing openings are formed in the belt width direction, at each of a plurality of positions at predetermined intervals in the recording medium conveyance direction, and the detection hole is formed only in the flushing region.

9. The inkjet recording apparatus according to claim 1, wherein the interval detection mode and the thickness calculation mode are executed in a time period from when power is turned on until when a first execution of image formation is performed.

10. The inkjet recording apparatus according to claim 1, wherein the interval detection mode and the thickness calculation mode are executed immediately before image formation, each time image formation is executed.

11. The inkjet recording apparatus according to claim 1, wherein the interval detection mode and the thickness calculation mode are executed each time a number of sheets of the recording medium printed reaches a predetermined number.

* * * * *